United States Patent

[11] 3,588,829

[72] Inventors Lawrence J. Boland;
Gerry D. Granito, Poughkeepsie, N.Y.
[21] Appl. No 776,858
[22] Filed Nov. 14, 1968
[45] Patented June 28, 1971
[73] Assignee International Business Machines Corporation
Armonk, N.Y.

[54] INTEGRATED MEMORY SYSTEM WITH BLOCK TRANSFER TO A BUFFER STORE
5 Claims, 9 Drawing Figs.

[52] U.S. Cl. .......... 340/172.5
[51] Int. Cl. .......... G06f 9/08
[50] Field of Search .......... 340/172.5; 235/157

[56] References Cited

UNITED STATES PATENTS

| | | | |
|---|---|---|---|
| RE26,087 | 9/1966 | Dunwell et al. | 340/172.5 |
| 3,248,702 | 4/1966 | Kilburn et al. | 340/172.5 |
| 3,248,708 | 4/1966 | Haynes | 340/172.5 |
| 3,339,183 | 8/1967 | Bock | 340/172.5 |
| 3,340,513 | 9/1967 | Kinzie et al. | 340/172.5 |

*Primary Examiner*—Paul J. Henon
*Assistant Examiner*—Harvey E. Springborn
*Attorneys*—Hanifin and Clark and Douglas R. McKechnie ABSTRACT: A data processing system has a memory hierarchy including a high-speed low-capacity buffer store (BS) located between a central processing element (CPE) and a low speed high-capacity main store (MS). Memory accessing, to store data in or fetch data from an addressed word location, by the CPE and by channels is controlled by a storage control unit (SCU). Addresses specified refer to MS word locations. For CPE access requests, a test is made to determine whether the content of the MS addressed location is resident in the BS. If it is, then a store is made in both the BS and MS while a fetch is made only from the BS. If the addressed word location is not resident in the BS, then a store is made only in MS and a fetch is made from the addressed location of MS. The data fetched from the addressed MS location is transferred to the CPE and loaded in a word location of the BS. When such a fetch is made to MS, the SCU also fetches additional words, contiguous to the addressed word, to form a block and loads the block in the BS. Overlapping operation allows a plurality of block transfers from MS to be initiated by the SCU for successive access requests which find the addressed locations nonresident in the BS. Channel requests access only the MS. Associated with each block of words in BS is a valid bit which permits access to words in BS only when set. During a channel store, if the addressed location is in the BS, the valid bit associated with that location is reset signifying that the data content of the corresponding MS location has been changed.

INVENTORS
LAWRENCE J. BOLAND
GERRY D. GRANITO
BY Douglas R. McKechnie
ATTORNEY

INTEGRATED MEMORY SYSTEM WITH BLOCK TRANSFER TO A BUFFER STORE

BACKGROUND OF THE INVENTION

1. Field of the Invention

This invention relates to improvements in data processing systems having a memory hierarchy including a high speed buffer store.

2. Description of the Prior Art

A data processing system generally comprises a main memory or store for holding data and instructions to be acted upon by a central processing unit or element (CPE). The CPE is generally composed of circuits that operate at a high speed while the main memory is generally composed of ferrite storage devices, e.g., magnetic cores, that operate at a lower speed. The system operation has been limited by the slow speeds at which the memory can be accessed. This gap between the circuit speed and memory access time has been accentuated by the trend to make computers faster in operation and larger in storage capacity. In order to minimize the effect of such gap in speeds and provide improved system performance, two developments have occurred in the prior art—storage interleaving and buffer storing.

In storage interleaving, the main memory has a plurality of storage modules that can be selected independently and operated in an overlap fashion. Successive addressable word locations are in different modules. The success of this development is primarily due to the sequential nature of processing and storing programs and data. Programs generally include a series of instructions which are normally processed in sequence and are stored in main memory at successive word locations. The data being acted upon by the program are also generally stored in successive locations. Thus, due to the sequential nature of the processing, successive accesses to memory are to the separate modules so that the effective memory cycle time of the memory system approaches that of the memory cycle time of a single module divided by the interleaving factor. For example, if a memory system has four interleaved modules, each with a memory cycle time of 12 machine cycles, the effective memory system cycle time approaches three cycles. While interleaving does improve system performance, the ideal effective memory cycle time is seldom realized due to program branches, interrupts, and other discontinuities. An example of a large scale high-speed data processing system having an interleaved memory is disclosed in application Ser. No. 578,745, filed Sept. 12, 1966 by L. J. Boland et al., for "Control System For Interleave Memory," now said application being assigned to the assignee of the present invention, now U.S. Pat. No. 3,449,724. The basic concept of memory interleaving is shown in RE.26,087 also assigned to the assignee of this invention.

The other development, buffer storing, involves a storage hierarchy organization in which a high-cost, high-speed, low-capacity storage device (known as a buffer store) is interposed between the CPE and a low-cost, low speed, high-capacity main store. The effectiveness of the buffer store arrangement is due to the nature of a program which tends to work with randomly located groups of instructions and data. By selecting a buffer store of sufficient capacity to hold most of these groups, the CPE accesses the buffer store most of the time with only an occasional access to main store. Thus, such a memory system provides an effective speed approaching that of the high-speed buffer store having the larger capacity of the main store. An example of a buffer scheme is disclosed in U.S. Pat. No. 3,248,702–Kilburn et al., assigned to the assignee of the present application.

While the above developments are seemingly alternate ways to providing a faster memory system, it has also been suggested to provide a memory system that combines both schemes for achieving improved performance. In one suggested arrangement, the main storage is logically divided into a number of pages each containing a number of groups of words. The buffer storage is arranged to contain a limited number of pages, for example 16 pages. An associative memory is used to store the page addresses to indicate which pages are in the buffer store. When a fetch request occurs, the associative memory is interrogated to see if the page containing the addressed word resides in the buffer store. If not, then the addressed word is fetched from main store and placed in the buffer store for future reference. As there is a high probability that other words located adjacent to the same word will be needed, the words are arranged in groups or blocks and each time a new word is fetched from main store and read into buffer store, the other words in the associated block are also fetched. This fetch operation is known as a transfer or block transfer operation. Due to interleaving of the storage modules, the words in each block are in successive storage modules and the transfer occurs at relatively high speeds due to the interleaving.

In view of the foregoing general state of the prior art, then, the subject invention relates to improvements thereover in the area of the overall organization of the buffer store and main store and the area of block transfers. As to the general hierarchy organization, it has been found that a program being executed tends to work with scattered groups of instructions and data, as previously discussed. In the prior art, the buffer store has been generally limited to relatively few groups of entries. Thus, in the above described buffer storage interleaved system, there are only 16 pages allowed to reside in the buffer store. In view of the relatively large scattering or random scattering of the various groups of words that a program is working with, then, it has become apparent that the relatively small number of groups within the buffer store results in an excessive amount of replacing pages and transferring new blocks of words into the buffer store. If one were to increase the number of pages, there would also be a need for increasing the size of the associative memory. In view of the relatively high cost of associative memories, such a system becomes impractical.

As to the prior art transfer operations, they have, to our knowledge, been either one of two types. In the first type, when a fetch request requires a transfer, further fetch requests are inhibited until the transfer is complete. In this type the fetch request and transfers are serial. In the second type, when two fetch requests are received both of which require a transfer, the transfer of the second is inhibited until the first transfer is complete. In this second type, the transfers are serial. In both types, there is no overlap of any of the transfer operations.

SUMMARY OF THE INVENTION

Consequently, one of the objects of the invention is to provide a low-cost buffer memory system accommodating a large number of entries so as to minimize the amount of block transfer.

Another object is to provide a buffer store memory arrangement having improved means for the transfer of new blocks into the buffer store.

A further object is to provide a memory system wherein the system performance is improved by providing a buffer arrangement which minimizes the number of block transfers and by providing improved block transfer operations.

Still another object to provide a buffer storage where blocks of words are transferred from a main store into a buffer store in an overlapped fashion.

Another object is to provide a high-speed memory system having a high degree of overlap or concurrency wherein additional accesses to the memory system may be executed after a block transfer has been initiated.

In accordance with one feature of the invention, certain of the above objects are achieved by providing a memory system having a main store divided into a plurality of sets of blocks of words. The buffer store is also arranged to contain a plurality of sets of blocks of words where each set in the buffer store is associated with a different one of the sets of the main store and wherein the number of blocks containable in the buffer store within a set is relatively small in comparison to the number of blocks in a set in the main store. The blocks in main store are identified by a block identifier. Upon loading a block into the buffer store, the block identifier is also loaded into a high-speed memory device where the address of the set containing the blocks is used as the address of the memory device. When a fetch request occurs, the memory device is cycled to read out the block identifiers of the addressed sets and such identifiers are compared with the fetch request address. If a match occurs, then the word is read from the buffer store. If a match does not occur, then the word and its associated block are transferred from the main store to the buffer store. When the buffer store is filled, new blocks replace old blocks resident within the buffer store according to the algorithm of replacing the most remote successfully fetched-from block. The advantage of this feature then is to allow a large number of sets of blocks to be contained in the buffer store so as to minimize the number of block transfers during the course of execution of a program. This is accomplished by providing a relatively low-cost arrangement for accessing the buffer store.

In accordance with another feature of the invention, the interleaved main store and the buffer store are provided with separate and independent storage address busses. Fetch requests are placed on the buffer storage address bus and if the data is not resident within the buffer store, then the fetch request is placed into one of a plurality of transfer address registers which control a block transfer operation. After a block transfer has been initiated, the addresses of the words of the block are placed on successive machine cycles on the main store address bus. At a later time, the data is read from the storage modules on successive machine cycles and fed to the buffer store. Concurrently, the addresses into which the words are to be written in the buffer store are placed on the buffer storage address bus. Where more than one fetch request arrives that requires a block transfer, then advantage is taken of the relatively long access time, before the first word is read from the main store, to allow new fetches or stores to locations resident in the buffer store. The block transfer operations are also overlapped to the extent that once a memory module has completed cycling in accordance with the first block address, the same memory module associated with the second block transfer can be selected before the data transfer from the first block has been completed. The advantage of this feature provides improved performance by allowing an overlapped operation which makes use of machine cycles that would otherwise be wasted.

The foregoing and other objects, features and advantages of the invention will be apparent from the following more particular description of the preferred embodiments of the invention, as illustrated in the accompanying drawings.

GENERAL DESCRIPTION

While it will be apparent to those skilled in the art that the invention can be embodied in different data processing systems, it will be disclosed herein as embodied in a system of the type disclosed in the aforementioned copending application, to which reference may be had for details not disclosed herein. In the present application, only so much of the system as is necessary to impart an understanding of the invention will be disclosed. Thus, conventional features such as parity circuits, storage protect, etc., have been omitted for simplicity in understanding the invention.

Figure 1:
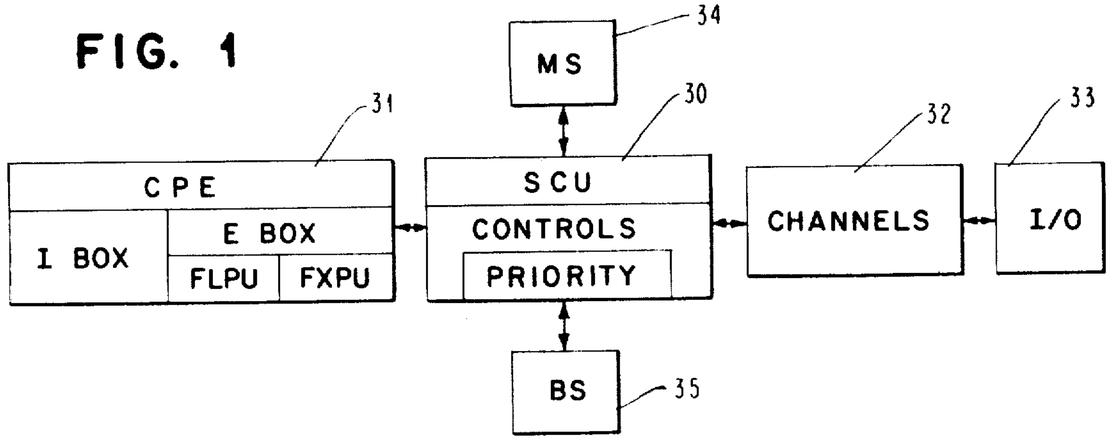
FIG. 1 is a schematic block diagram of a data processing system embodying the invention.

Referring to FIG. 1, the data processing system comprises a storage control unit (SCU) 30 controlling the accessing of a memory system by a central processing element (CPE) 31 and by channels 32 and I/O devices 33. The memory system includes a magnetic core main store (MS) 34 and a buffer store (BS) 35 implemented in high-speed circuits. Relative to the system disclosed in said copending application, the system disclosed herein differs by the elimination of the peripheral storage control element (PSCE) and the extended main store (EMS), by substituting SCU 30 for the main storage control element (MSCE), by having channels 32 communicate directly with SCU 30 and by the addition of BS 35.

As to the general operation of the system, CPE 31 includes an instruction unit of I Box and an execution unit or E Box divided into a floating point unit (FLPU) and a fixed point unit (FXPU). CPE 31 establishes the basic machine cycle governing the timing and operation of the system. Due to a high degree of concurrency, overlapping and buffering, the system attempts to process one instruction per machine cycle. The I Box controls the fetching of instructions and operands from the memory system by issuing appropriate requests to SCU 30.

Instructions are buffered in the I Box and are issued one at a time. The I Box decodes each instruction for execution by the I Box, FXPU or FLPU according to the nature of the individual instructions. The I Box sends partially decoded instructions to the FXPU and FLPU and it also issues access requests to SCU 30 as required by the instructions.

SCU 30 controls the accessing of the memory system and it includes the priority circuits and control circuits suitable for this purpose. Initially, all information is placed in MS 34 and as a program commences its operation, groups of information including both instructions and data are transferred into BS 35. MS 34 has a basic memory operating cycle of 13 machine cycles and an access time of 10 machine cycles while the effective access time of BS 35 is three machine cycles. During the course of executing a program, CPE 31 primarily accesses BS 35 and thereby achieves the improved system performance due to the high-speed operation of BS 35 relative to that of MS 34 while the BS 35 presents to the CPE an apparent storage capacity equal to that of MS 34.

Figure 2:
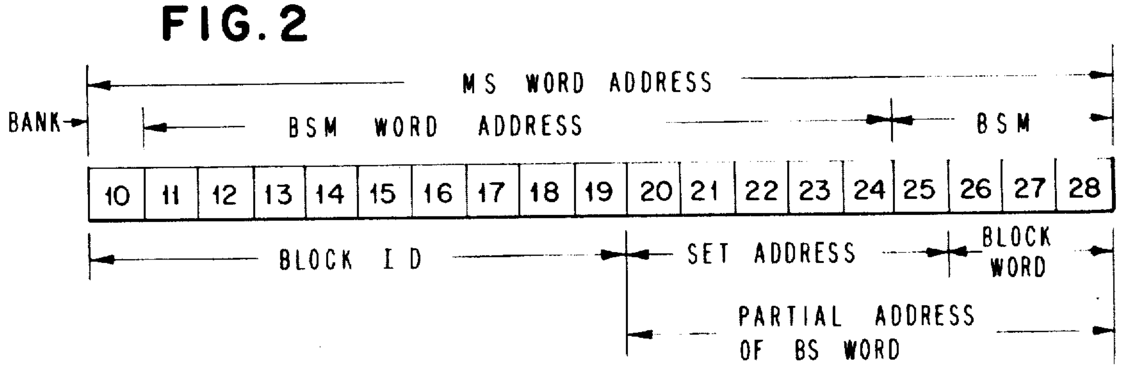
FIG. 2 is a diagram illustrating the addressing spectrum used in the memory system.

For the purpose of illustrating the invention, MS 34 is assumed to have a storage capacity of 524,288 words of 72 bits. To provide this capacity, MS has 32 basic storage modules (BSM) arranged in two banks and interleaved 16 ways. Each BSM has a capacity of 16,384 words. Referring to FIG. 2, the address for such a memory system consists of 19 address bits numbered 10—28. Bit 10 defines which bank is being accessed, bits 25—28 identify which BSM is being accessed, and bits 11—24 define a BSM word address, that is the address of a given word or location within a BSM. By placing the BSM address at the low order end of the addressing spectrum, then, it should be apparent that successive word locations, that is locations having addresses differing by an increment of one, are located in different BSM's so as to provide an interleaving factor of 16.

Figure 3:
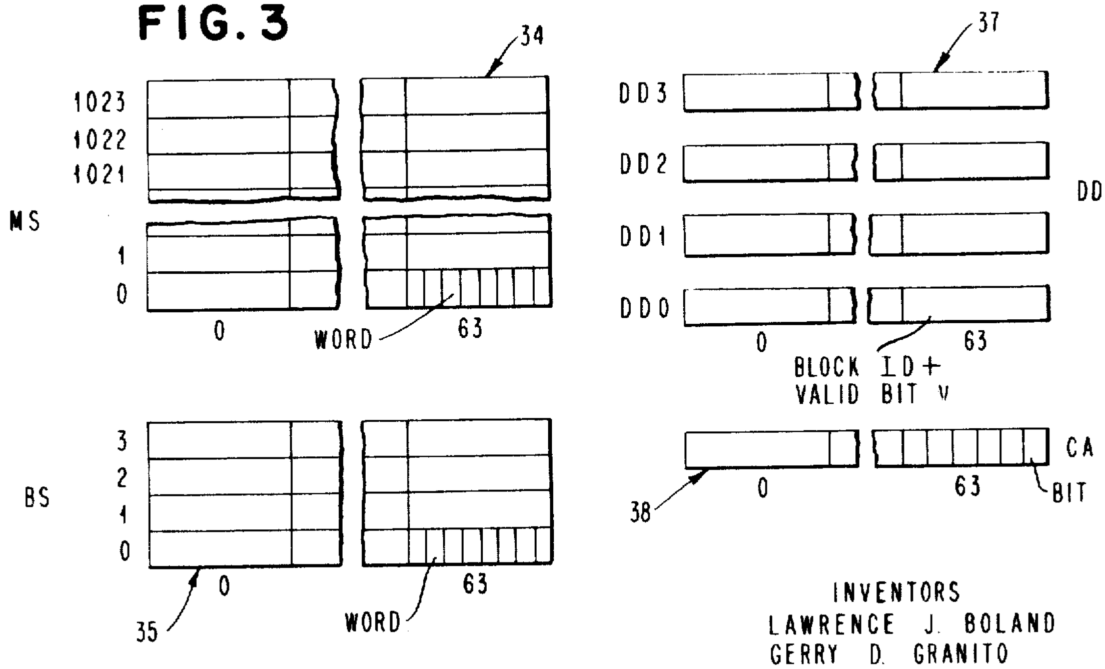
FIG. 3 is a diagram illustrating the logical arrangement of the memory system.

Refer now to FIGS. 2 and 3. By reconsidering the address bits in a different fashion, MS 34 can be logically considered as divided into 64 sets of 1,024 blocks of eight words. To accomplish this division, bits 20—25 define the set address, bits 26—28 define the location of a word within a block and bits 10—19 identify a particular block within a set. The binary configuration of bits 10—19 is known as the block ID. BS 35 is a random access, high-speed memory having a capacity of 2,048 72-bit words. The actual buffer cycle time is equal to one machine cycle during which data can be read from or written into a particular location. However, as pointed out previously, the effective buffer access time is three machines cycles due to the fact that a determination is first made as to whether the accessed locations is in BS 15 before BS 15 is actually accessed or cycled. Reading is nondestructive. That is, each location is essentially a static register of binary triggers and readout of data is by sampling the contents of the addressed word location without regeneration. New data can be stored by overwriting or by first resetting the register to 0's prior to entry of new data. Addressing BS 35 requires 11 bits. BS 35 is logically divided into 64 sets, addressed by bits 20—25; of four blocks, addressed by two address bits B1—2 dynamically generated as the buffer is used, of eight words addressed by bits 26—28. It will be thus seen that the relationship between MS 34 and BS 35 is one where the respective sets of MS 34 correspond to the respective sets of BS 35. Within a given set, any one of the blocks in main store can be written into any one of the four blocks in BS 35. Words occupy the same position within a block whether in MS or BS 35. It should also be noted that due to interleaving of the main memory modules, the words within a given block of MS 34 are each located in a different BSM.

Words are serially written into BS 35 in blocks of eight words beginning with the word being fetched. When the first word of a block is written into BS 35, its block ID, represented by address bits 10—19, is also written into a corresponding word location in DD 37. DD 37 comprises four independent high-speed nondestructive, random access memories DD0—DD3 each of which has sixty-four 11-bit word locations 0—63 addressed by the set address bits 20—25. Each word location in DD 37 is associated with and related to a corresponding block in BS 35. During a memory access, the set address of an accessed location initiates the cycling of the four independent memories of DD 37 to read out four block ID's of the set which are compared with the block ID of the location being accessed to determine whether the addressed MS word is a word of one of the four blocks of the set in MS 34 stored in BS 35. If one of the block ID's accessed from DD 37 matches the block address bits 10—19, dynamically generated bits B1 and B2 will be generated in an identifying pattern to be utilized to address the proper one of the four blocks BS corresponding to the one of the four block ID's indicating a compare. In addition to storing the 10-bit block ID, each word of DD 37 also includes one valid bit V which is set when a new block of words is written into the associated block of BS 35. During a channel store operation when an addressed MS 34 location is being stored into, and the prior contents of the addressed location is also in BS 35, the valid bit of the associated block ID in DD 37 is reset or invalidated so that any subsequent CPE request to the same location would signal a no-compare and have to go to main store for a store operation or initiate a transmit of a block of words for a fetch operation. This prevents the use of data from BS 35 which may be different from that in main store after the channel operation.

Also associated with the memory system is a chronology array (CA) 38 that is also a nondestructive random access memory having 64 word locations addressed by the set address. Each word location contains 6 bits. Each time a word is fetched from one block of a set in BS 35, the word in CA 38 associated with the set is rewritten to reflect the order of fetching words from the blocks of BS 35. Six bits are needed to keep track of the order of fetching. The bits are used to initially control the filling of BS 35 and to thereafter control the overwriting of a block when a new block is transmitted. When a particular set of BS 35 is filled and a new block is transmitted, the block to be replaced is the fourth most recently fetched-from block as determined by the associated word in CA 38. An example of how this replacement algorithm is achieved can be found in the IBM Technical Disclosure Bulletin, Vol. 10, No. 10, Mar. 1968, Page 1,541, entitled "Logical Push-Down List" By J. S. Liptay.

While there is nothing critical to the exact capacity of BS 35 and its logical division, as previously described, yet the particular arrangement illustrated is one chosen on the basis of cost and performance to advantageously provide maximum performance for the lowest cost. A BS 35 of larger block or word capacity does not give that much increased performance relative to the cost whereas one of a lesser capacity decreases the performance without proportionately decreasing the cost. For the given size of BS 35, the arrangement of 64 sets of four blocks is also advantageous because it allows a relatively large number of scattered groups of information to be stored therein so as to minimize the amount of block transfers and replacements. Even within a set, the provision of more than four blocks does not seem to significantly improve the performance whereas the provision of less than four blocks increases the amount of block transfers and thereby degrades performance.

As to the general operation of the system thus far described, when a program initially commences execution, and the CPE issues fetch requests for both instructions and data, blocks of words are written into BS 35. The initial word of each block transferred into BS 35 is sent to the CPE while the remaining words are stored in BS 35 on successive machine cycles. When a word is fetched from BS 35, the associated word in CA 38 is updated. When a CPE fetch request is sent to the SCU, the set address of the addressed word initiates the cycling of DD 37 causing the four words corresponding to the particular set to be read out and compared with the block ID of the addressed word. If a match occurs, thus indicating that the addressed word is in BS 35, the match signal is used to generate the two dynamic address bits B1—2 of the BS word address, and the thus formed BS word address is fed to BS 35. The fetched word is returned to CPE 31 three machine cycles after the fetch request is received.

If on cycling DD 37 no match signal is generated, the fetch request is buffered to initiate a block transfer operation. To accomplish this operation, MS 34 is accessed so as to serially read out the eight words of the associated block. During such block transfer, it is to be recalled that the main memory cycle time is 13 machine cycles and that data becomes available at the end of the 10th cycle, i.e., in the 11th cycle. Thus, there is a gap of 11 cycles before words are returned from MS 34 to BS 35 and CPE 31. This time gap thus allows other requests, subsequent to that which initiated the transmit operation, to be received and executed. During this gap, additional fetch or store requests can access the buffer store. Should a fetch request come for a word not in the buffer store, then a second transmit operation is initiated. If this second request is to a portion of main store having different group of eight BSM's than the eight BSM's being selected by the first request, then such BSM's can be selected as soon as signals are sent to the first group so as to cause an overlapping of the selection of the particular BSM's and the return of data from other BSM's to the BS 35 and CPE 31.

As previously indicated, channel store and fetch requests are to MS 34. On a channel fetch request, the addressed word is supplied directly from MS 34 to channel 32. On a channel store request, if the block containing the address being stored into is contained in BS 35, the block is invalidated by resetting the associated valid bit in DD 37.

DETAILED DESCRIPTION

Figures 4, 4A:
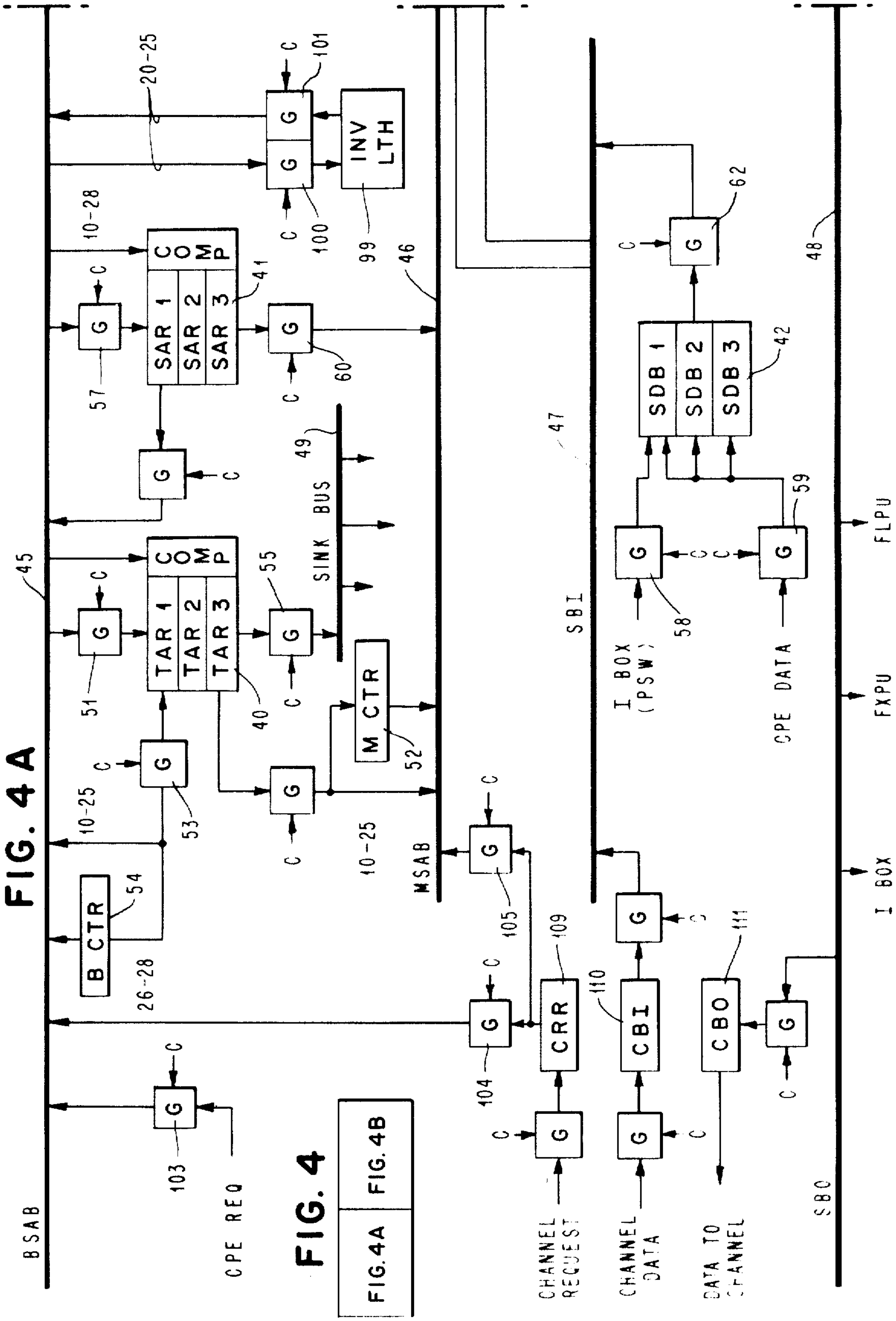
FIG. 4 is the key to arranging FIGS. 4*a* and 4*b* to form a schematic block diagram illustrating the principal functional units and data and address paths within the storage control unit and memory system.
Figure 4B:
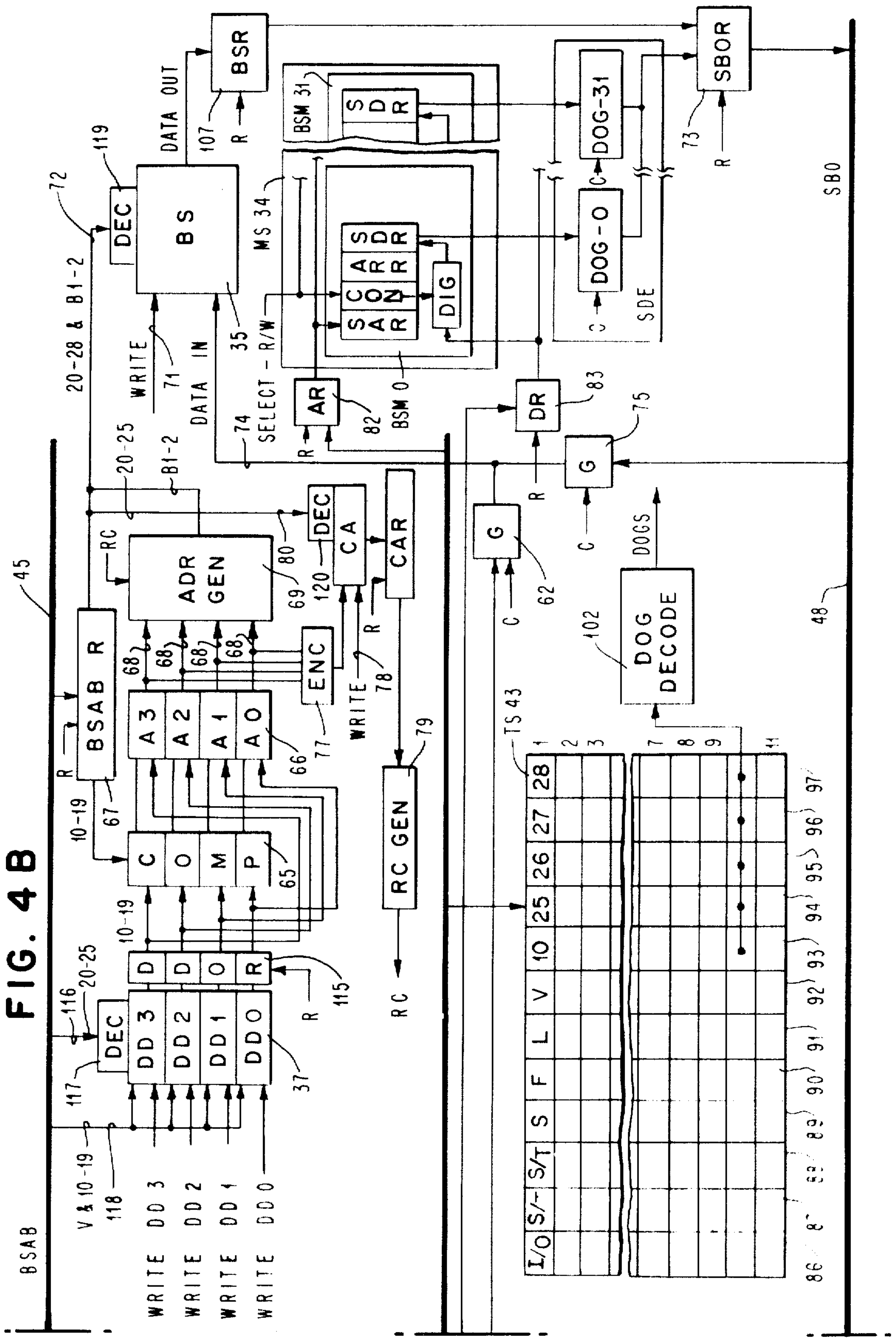

With reference to FIG. 4, in addition to DD 37 and CA 38, SCU 30 has a transfer address register stack (TARS) 40, a store address register stack (SARS) 41, a storage data buffer stack (SDBS) 42 and a timer stack (TS) 43. These units are associated with a bus system comprising a buffer storage address bus (BSAB) 45, a main storage address bus (MSAB) 46, a storage bus in (SBI) 47, a storage bus out (SBO) 48 and a sink bus 49.

Figure 5:
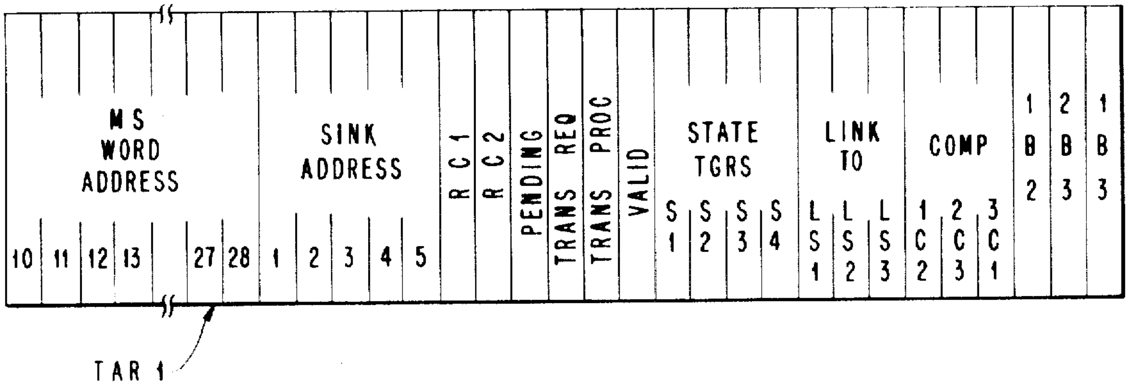
FIG. 5 is a schematic diagram functionally illustrating triggers used in the transfer address registers.

TARS 40 includes three registers, TAR 1–TAR 3 each of which is identical so that only one need be described in detail. TAR 1 contains a plurality of triggers arranged in fields as shown in FIG. 5 so as to store information and control bits as follows:

1. MS WORD ADDRESS bits 10—28 indicate the address of the word being fetched. These bits are set when a fetch request appears on BSAB 45 and are overwritten when a new fetch request is placed in TAR 1.
2. SINK ADDRESS bits 1—5 define the address of the CPE sink to which data will be returned. These bits are set and overwritten at the same time as the word address bits.
3. Replacement code bits RC1 and RC2 indicate the fourth most recently fetched from segments of DD 37. These bits are set by signals from replacement code generator 79 and are used to write the words of a block transmit into the appropriate locations in BS 35.
4. PENDING bit is combined with a match signal to indicate to the controls which TAR holds the fetch request that will access BS 35.
5. Transmit required (TRANS REQ) bit is used to indicate that a block transmit from MS 34 to BS 35 is required. It is used by the controls to assign transmit priorities.
6. Transmit in process (TRANS PROC) bit indicates that the TAR 1 is processing the main storage selection portion of the block transmit. It is used to interlock with other transmits.
7. VALID bit indicates that the contents of TAR 1 is valid and waiting for priority to access memory. When the valid bit is off, it indicates that TAR 1 is empty and can be loaded from BSAB 45 with a CPE fetch request. The valid bit is set when TAR 1 is loaded and it is reset by the occurrence of a match signal and by the completion of a transmit.
8. State triggers S1—S4, respectively, indicate a TAR 1 transmit in process and link to a SAR, a TAR 1 transmit in process off but still linked to a SAR, a TAR 1 transmit in process off and not linked during transmit, and a valid CP fetch to TAR 1 and TAR 1 pending. These bits are used for sequencing stores and fetches.
9. Link to SAR bits LS1, LS2 and LS3 identify which SAR has the same complete address as the TAR. These bits inhibit the TAR from recycling on BSAB 45 until after the linked SAR has been outgated to the BSAB.

The preceding bits exist in each of the three TAR's whereas the following control bits are common to all three TAR's:

1. Three compare to TAR bits 1C2, (the address in TAR compared with that in TAR 2) 2C3, 3C1 which are set when there are two fetches to the same block to indicate which TAR's hold the requests. These bits are used to allow the first fetch request to fetch the desired block. The second fetch is buffered until the transmit is completed whereupon the second request is placed on the BSAB with the likelihood being that the desired word then resides in BS 35.
2. Three bits 1B2, (TAR 1 loaded before TAR 2) 2B3 and 3B1 indicate the respective order in which the TAR's are loaded to establish a first in-first out priority relationship among the TAR's, these bits being set and reset as a function of the ingate controls of the three TAR positions.

The general operation of TARS 40 is as follows. When a fetch request appears on the BSAB 45, during one machine cycle, the request is gated by a gate 51 into an empty TAR. The TAR VALID and PENDING bits are set in the beginning of the next machine cycle. If the desired word is resident in BS 35, the VALID bit is reset at the end of such cycle indicating that the TAR can be used on the cycle afterwards to receive another request. If there is a no match condition, the PENDING bit is reset while the VALID bit remains on indicating that a transmit is required. At the same time the TRANS REQ bit is turned on. When the fetch request is initially placed in a TAR, bits 10—25 of the fetch request are compared with corresponding bits in any of the other TAR positions to determine whether the fetch is to the same block. If it is, then the appropriate compare to TAR bit is set. At the same time the address of the word being fetched is compared with the addresses of the locations being stored to with stores in SAR's 41. If this address compares, indicating that there is an outstanding store request to the same address, the store request is first completed after which the fetch request is made. The comparison causes the appropriate link to SAR bit to be set. When a fetch request is loaded into a TAR, the second cycle is used, while the TAR is still valid, to gate out the sink address onto sink bus 49, one cycle ahead of when the data from BS 35 is placed on SBO 48.

In the course of transmitting a block of words, the TAR holding the fetch request acts as an address queue to place the address of each word being fetched from MS 34 to be gated on to MSAB 46. To accomplish such addressing, bits 10—25 are placed directly on MSAB 46 on eight successive machine cycles. Bits 26—28 are loaded into a 3-bit main store counter (M CTR) 52. This counter has the capability of flushing through the first 3-bit address loaded thereon on one machine cycle. During the successive seven machine cycles it is incremented by one, in wrap around fashion, to produce in conjunction with bits 10—25 the word addresses of the remaining seven words. In a similar fashion, when the words being fetched from MS 34 are placed serially on SBO 48, their addresses are also gated serially through gate 53 onto BSAB 45. Bits 10—25 are gated directly from the TAR on to the BSAB while bits 26—28 pass through a buffer counter (B CTR) 54 that operates in a manner similar to M CTR 52 to place successive addresses on BSAB 45 on successive machine cycles so as to cause the fetched words to be written into the appropriate locations of BS 35. On the machine cycle before that in which the first word of a block is place on SBO 48, the sink address within the TAR being transmitted is gated by a gate 55 onto the sink bus 49. Thus, on the next machine cycle, the first word in the block, in addition to being read into BS 35, is also sent to the appropriate sink in CPE 31.

SARS 41 and SDBS are similar to those described in the aforementioned copending application and work in the following general manner. When a CPE store request is placed on BSAB 45, the request is gated by a gate 57 into an empty one of the SAR's. Three machine cycles later, the data to be stored is also gated via gates 58 or 59 into the associated SDB. When the data arrives, a signal is sent to the priority circuits requesting priority and on the next machine cycle, the address of the location being stored in is gated through gate 60 onto MSAB 46. As data is skewed by three machine cycles going into MS 34, the data in a SDB is gated three machine cycles later through a gate 62 onto SBI 47. Such operation is similar to that described in the aforementioned application. With reference to the present application, SAR's 41 is operated so that in the cycle after placing the address of a word in MS 34 on MSAB 46, the address is also placed on BSAB 45. DD 37 is cycled to see if the location is also stored in BS 35. If it is, then a BS cycle is taken in synchronism with placing the data on SBI 47 and such data is gated in via gate 62 to be written into BS 35. The SAR operation differs from that described in the said copending application because the busy condition of a BSM is determined during the priority cycle so as to guarantee acceptance of the SAR request when it is outgated.

As previously indicated, BS 35, DD 37 and CA 38 are random access, high-speed memory devices. These devices are advantageously of a type similar to that shown in U.S. Pat. No. 3,394,356-Farber, for "Random Access Memories Employing Threshold-Type Devices" and generally comprise memory cells that are controlled by word and bits pulse generators, and sense amplifiers that provide output signals indicative of the controls of the selected cells. In the present invention, BS 35, DD 37 and CA 38 uses such memories in conjunction with decoders DEC's for decoding the addresses so as to actuate the appropriate pulse generators to select the desired words, and with output registers that are set by outputs from the sense amplifiers of the memories. Reading is nondestructive and is done by applying the address bits to the decoder so as to cycle the memory to read out the selected word. Writing is done by simultaneously applying the address, data and write signals. The memory cycle time for both read and write cycles is one machine cycle.

DD 37 comprises four independent memories DD0—DD3, connected to a data directory output register (DDOR) 115 which holds the four words read from DD 37 for one machine cycle until reset by a signal R. Line 116 feeds the set address bits 20—25 from BSAB 45 to DEC 117 of DD 37 and line 118 feeds the block ID and valid bits to the data inputs of the memories.

Connected to the output lines of DDOR 115 is a comparator (COMP) 65 which receives signals representing the four block ID's from DDOR 115. When an address appears on BSAB 45, it is gated into a BSAB register (R) 67. From this register signals representing bits 10—19 are fed as another input to comparator 65 to be compared with the respective outputs of DDOR 115. Should a comparison exist, then a signal is fed from the output of the corresponding portion of comparator 65 to the corresponding input of one of a series 66 of AND gates A0—A3. These AND gates also respectively receive signals representing the valid bit V of the words read out from the DD's. If the bit is valid, then the appropriate gate of 66 produces a match signal on the appropriate one of lines 68.

Lines 68 apply the match signals as inputs to an address generator 69 which generates the two dynamic address bits B1—2 that logically divide BS 35 into four segments. Bits B1—2 are combined with bits 20—28 coming from BSAB R67 to provide the full address on line 72 of the word being accessed in BS 35.

BS 35 is a high-speed storage device that operates or has a memory cycle of one machine cycle. A read operation is accomplished by the address bit signals on line 72 being fed to DEC 119. A write operation is commenced by a write signal on line 71, address bits on lines 72 and data bits on line 74 which data bits come from SBI 47 via gate 62 or from SBO 48 via gate 75. The output of BS 35 is latched in output register BSR 107 for one machine cycle until it is reset by a reset signal R. The output of BSR 107 is fed to storage bus out register (SBOR) 73 and is latched therein for one cycle until reset by a reset signal R. The output of SBOR 73 places the data on SBO 48.

CA 38 is used, as indicated previously, to reflect the order of fetching from the four segments of BS 35. To accomplish this, the respective output lines 68 of gates 66 are connected to the inputs of an encoder 77 whose output supplies data bits for CA 38. The encoder is operative to supply 1 and 0 data bits for reflecting the fetch order 95 described below. Whenever a match signal appears on a line 68, during a fetch operation, a write signal is fed via line 78 to CA 38. The set address of the word being fetched is fed via line 80 to DEC 120 causing the appropriate bits of addressed word to be appropriately written in CA 38. As six bits can be used to reflect the order of accessing or fetching from four different units, the bits of the appropriate word of CA 38 are set during each fetch, as shown in Table 1.

TABLE 1

| | Bit conditions | |
|---|---|---|
| Bit number | 1 | 0, |
| 1 | 1A2 | 2A1 |
| 2 | 1A3 | 3A1 |
| 3 | 1A4 | 4A1 |
| 4 | 2A3 | 3A2 |
| 5 | 2A4 | 4A2 |
| 6 | 3A4 | 4A3 |

With this table, the code "1A4, e.g., associated with bit 3 being a 1, means that segment 1 was fetched from after segment 4. When a fetch request appears on BSAB 45, and there is no match signal on lines 68, the set address is fed from BSABR 67 to CA 38 causing it to read out the particular set position. The readout latched in the output register CAR 121 of CA 38 for one cycle so as to feed signals to a replacement code generator (RC GEN) 79 produces, as an output, the two replacement code bits RC1 and 2 that are placed in the TAR containing the fetch request. As previously indicated, the RC bits are used to control the filling of each set in BS 35 and to thereafter write a new block into BS 35 by overwriting the block that is the fourth most recently successfully fetched-from block.

MS 34 has 32 BSM's, BSM0—BSM31. Addresses on MSAB 46 are latched in an address register AR 82 for one machine cycle. Similarly data from SBI 47 is latched into a data register 83 for a machine cycle preparatory to being read into MS 34. Select and read or write signals are placed on line 84. Each BSM includes its own storage address register (SAR), controls, core array, storage data register (SDR) and data in gate (DIG). A storage distribution element SDE is associated with MS 34 and has 32 data out gates DOG 0—DOG 31 each connected to a BSM SDR. During a read cycle, when data appears in an SDR, the appropriate DOG is actuated by a signal from TS43 causing the fetched word to be fed into SBOR 73.

TS43 is similar to the accept stack described in the aforementioned copending application in that it comprises a series of 11 pushdown registers whose contents are stepped down through successive stages on successive machine cycles. The general purpose of TS43 is to synchronize cycling of MS 34 with operation of the system and provide control bits some of which are used by the control sections to obtain the appropriate priorities on BSAB54 when data arrives from MS 34, as a result of a transmit operation. Each stage of TS43 is adapted to contain a plurality of bits 86—97 that are loaded into TS43 on the cycle after MS 34 has been selected. Bit 86 is an I/O bit used to prepare the I/O circuits to receive any information being forwarded thereto. Bits 87 and 88 are SAR/TAR (S/T) bits, the two bits forming a code identifying the particular SAR or TAR. Bit 89 is a store bit S which, when on, represents a store operation and which, when off, represents a fetch operation. This bit in conjunction with bits 87 and 88 define the specific SAR or TAR. Bit 89 is a first F bit signifying the first word of a block transmit. It is used to cause the block identifier of the first word to be written into DD 37 at the appropriate time. Bit 91 is a last L bit used to signify the last word of a block transmit and it is used to invalidate the particular TAR controlling the particular transmit. Bit 92 is a valid V bit that is used in conjunction with bits 93—97 to signify to the DOG decoder 102 that an address appearing during cycle 7 of TS43 is to be decoded to actuate the particular DOG. Bits 93—97 correspond to address bits 10 and 25—28 respectively. These bits identify the particular BSM being cycled. Bits 25—28 are used by the control circuits to indicate which BSM is busy. Bits 10 and 25—28 are also used during cycle 10 to energize the particular DOG to gate out data being accessed. The illustrated embodiment assumes a minimum circuit delay and should a memory be located to that cable length causes a delay, the DOG signal may be taken from an earlier stage, e.g., stage 7, of TS43.

As previously indicated, during a channel store operation, if the location being stored to is resident in BS 35, the particular block containing that location is invalidated. To accomplish this, an invalidating latch (INV LTH) 99 is provided. During a channel store operation, the set address and valid bit V are placed on BSAB 45 and gated through gate 100 into invalidating latch 99. At the same time, the set address cycles DD 37 causing a readout. The block ID is also placed in BSAB R67 and fed to comparator 65 so that a match signal is generated if the location is contained in BS 35. In response to this match signal, the control section then overwrites the valid bit in latch 99 causing it to be invalid. A priority cycle is taken and if BSAB45 is free, then on the next cycle the set address is placed on BSAB45 to cycle DD 37 and the invalid bit is then written into the appropriate section of DD 37 to invalidate that particular block.

As previously indicated, the controls and priority section of SCU 30 is similar to that described in the aforementioned application except that it has been modified because of the elimination of the PSCE and EMS and by the addition of two storage address busses. The details of such modification form no part of the present invention so that they will not be described. However, in order to facilitate an understanding of the present invention, the general priority controls work as follows. Memory accessing is initiated by gating information to MSAB or BSAB. Since at any given time more than one of these operations may be pending, a priority decision is made during each cycle to determine what operation is to have control over the MSAB or BSAB during the following cycle. The priority logic sets controls called outgate triggers shown in the drawings as gates 103—105. These triggers gate addresses and associative control bits onto MSAB and BSAB. The general order of priority or service is:

1. Channel request to main storage.
2. TAR request to main storage.
3. SAR requests to main storage.
4. CPE requests.

CPE requests have the lowest priority. Priority on MSAB 46 is strictly controlled by the order of priority and the availability of the required BSM. Priority logic also insures any request that is about to be granted priority on MSAB will have priority on BSAB simultaneously or a fixed number of cycles later depending on the type of request. Priority on BSAB 45 is determined solely by the order of priority and availability of the BSAB time slot. For instance, a SAR outgated on MSAB 46 requires the availability of the BSAB time slot two cycles later. A TAR block transmit request serviced on MSAB 46 requires a BSAB time slot 10 cycles later. In addition, to prevent conflicts on the address busses, priority logic also resolves conflicts on the SBO and BSAB invalidating latch as certain requests require. The controls also provide gating signals C for operating the gates G and the resetting signals R for resetting the various registers.

DETAILED OPERATION

CPE Fetch Requests

Figure 6:
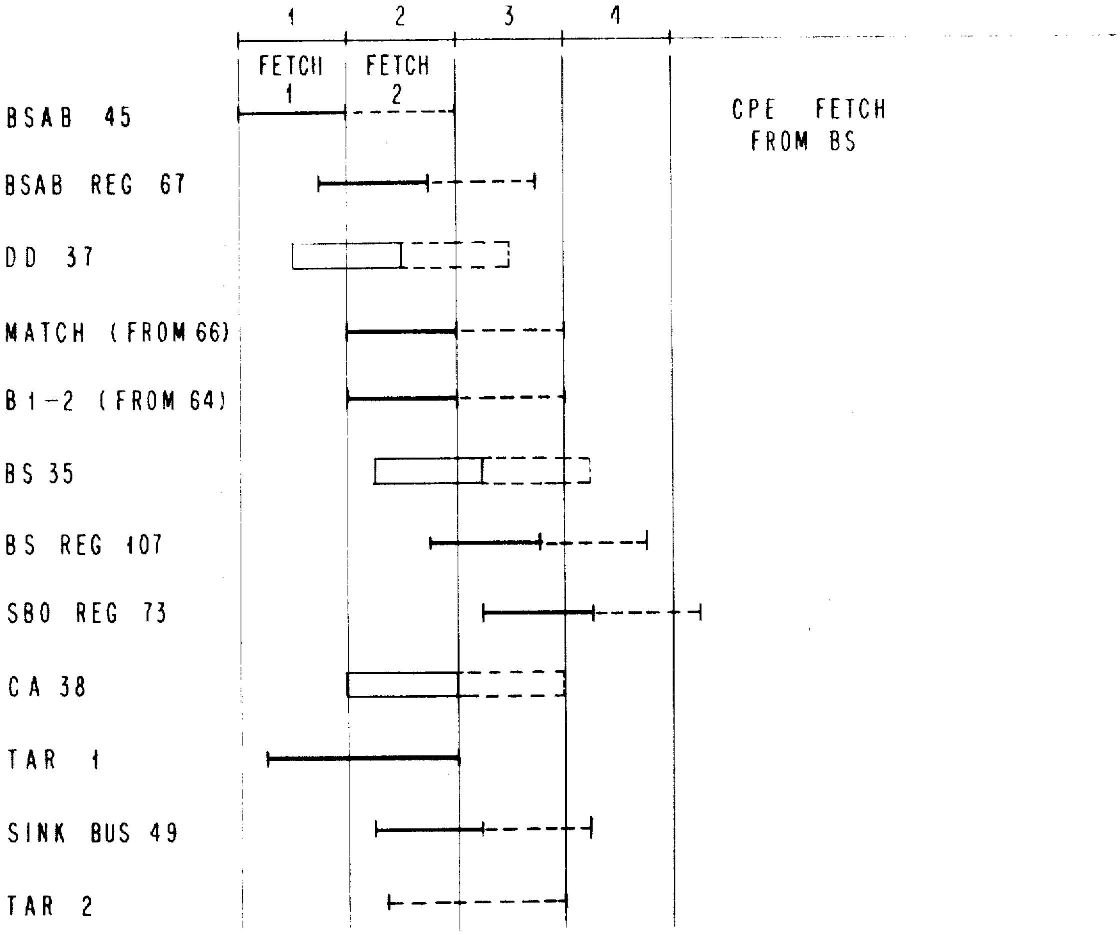
FIG. 6 is a timing chart for explaining a CPE fetch-from-buffer store operation.

Example 1. (two successive fetch requests from buffer store)—A timing diagram for this operation is shown in FIG. 6. At the beginning of machine cycle 1, the CPE fetch request is gated through gate 103 onto BSAB 45. The information is placed in BSAB REG 67 so as to overlap machine cycles 1 and 2. When the set address appears on BSAB45, it initiates the cycling of DD 37 so that the block ID's are read therefrom around the end of machine cycle 1 to provide a match signal from gate 66 in machine cycle 2. This match signal, in turn, causes address generator 69 to generate dynamic bits B1—2 that are combined with bits 20—28 from BSAB R67, to form the address for BS 35. After the beginning of cycle 2, BS 35 starts cycling and data is read therefrom into BS R107 prior to the end of the second cycle. During the third machine cycle, data is read from BS R 107 into SBO R73 and is held therein to overlap the cycle boundary between cycles 3 and 4. Data is read into the appropriate sink at the beginning of cycle 4. In response to the match signal, CA 38 is cycled at the beginning of cycle 2 to update the bits to reflect the order of fetching. When the fetch request is placed on BSAB 45 it is gated into one of the TAR's, for example TAR 1, and TAR 1 remains busy for about two cycles. During the second cycle, the address of the sink is gated through gate 55 onto sink bus 49 to signal the appropriate sink that the data will be arriving on the following cycle. When the second fetch request is gated onto BSAB 45 in machine cycle 2, as indicated by the dotted line, the same operation is performed as previously described except that it is displaced by one machine cycle, as indicated by the dotted lines in FIG. 6. The only difference is that fetch request 2 is gated into a different TAR, for example TAR 2, instead of TAR 1. Otherwise the operation is the same.

Figure 7:
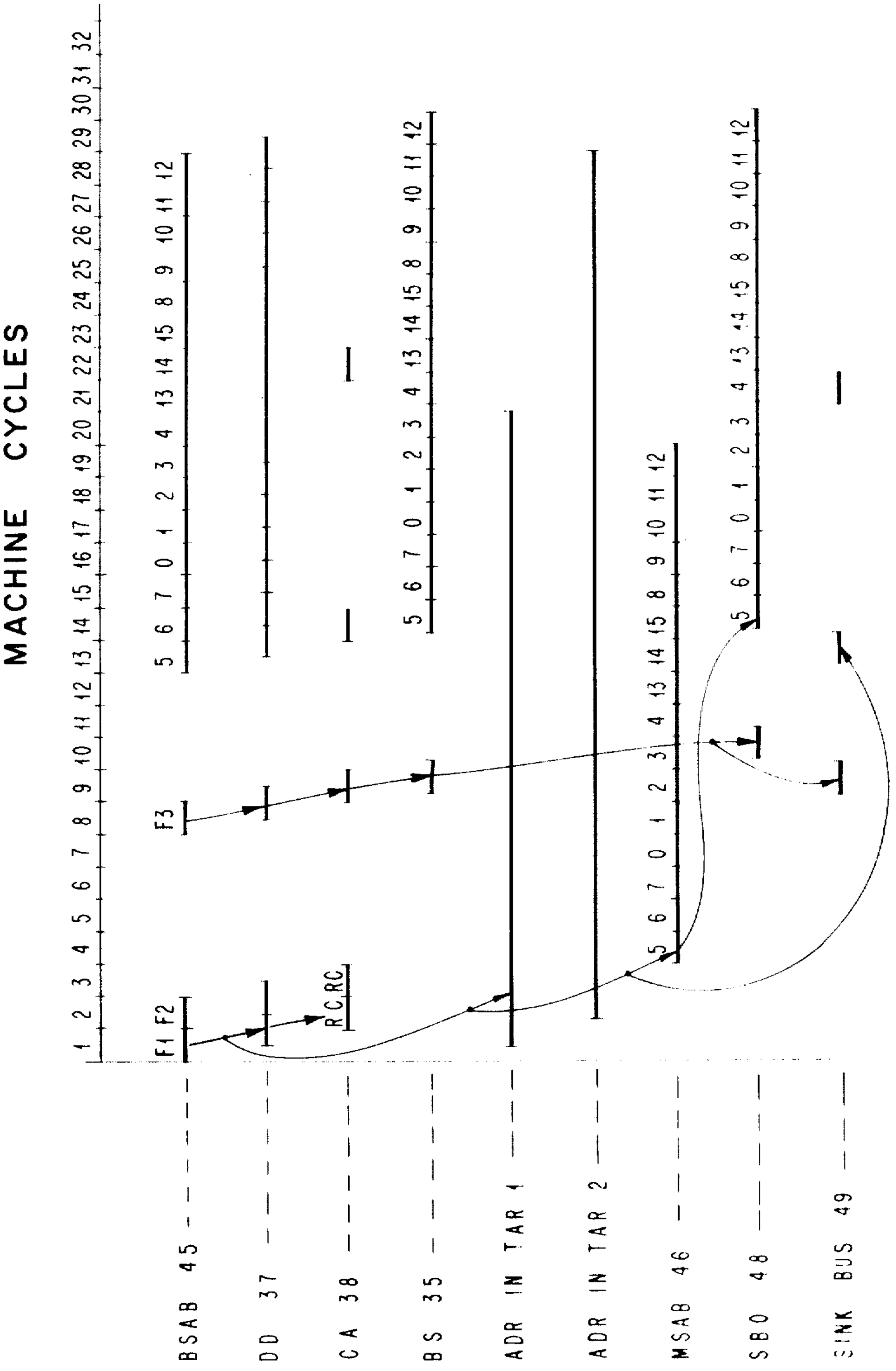
FIG. 7 is a timing chart for explaining a multiple fetch operation including overlapping block transfers.

Example 2. This example illustrates the overlapping nature of two block transfers. With reference to FIGS. 4 and 7, CPE fetch requests F1, F2 and F3 are placed on BSAB 45 on machine cycles 1, 2 and 8 where the first two requests F1 and F2 require block transfers, whereas request F3 is for a word already in buffer. F1 is for word 5 (in BSM5) and F2 is for word 13 (in BSM13). When F1 appears on BSAB 45, and DD 37 is cycled, no match signal appears because the word being fetched is not located in BS 35. The no match signal from gates 66 causes CA 38 to be cycled to generate the replacement code RC that is then placed in the appropriate TAR's. In this case, it is assumed that TAR's 40 are initially empty so that fetch F1 is loaded into TAR 1. Thus, the specific RC is loaded into TAR 1. When TAR 1 becomes valid indicating that a transmit is required, appropriate signals are sent to the controls. Within this example, it will be assumed, for simplicity of understanding the invention, that there are no priority conflicts. Thus, cycle 3 is a priority cycle where it is determined that the request in TAR 1 will be honored. Thus, on cycle 4, the fetch request for word 5 is placed on MSAB 46. The fetch signals for the remaining words of the block are also placed on MSAB 46 in the succeeding seven cycles. It is to be recalled that when a fetch request goes to MS 34, that data appears on SBO 48 in the 10th cycle after the fetch request is applied to the particular BSM. Thus, word 5 appears on SBO 48 during machine cycle 14. As the first word of each block is also sent directly to the CPE, the first word bit in TS43 is used to gate the sink address from TAR 1 onto sink bus 49 in the cycle preceding when word 5 appears on SBO 48. At this time, bits from TS43 signify to the priority section that beginning at the 13th cycle, the BSAB will be needed for transferring data from the main storage into the buffer storage. Thus, on cycle 13 the store or read in request for word 5 is placed on BSAB 45. Since word 5 is the first word of a block transmit, DD 37 is cycled whereby the block ID of word 5 is written into the appropriate DD according to the replacement code. The replacement code RC is fed from TAR 1 to ADR GEN 69 to provide bits B1—2 for addressing BS 35. CA 38 is cycled to update the fetch request. In cycle 14, BS 35 is cycled by a write signal, the address bits and the word 5 bits from SB048 to write word 5 in the appropriate location of BS 35. In a like manner, words 6, 7 and 0—4 are also written into BS 35 on successive machine cycles. Since these words are merely stored in BS 35, CA 38 is not updated. After the last word address has been placed placed on BSAB45, TAR 1 is reset.

As to fetch 2, the operation follows that associated with fetch 1 except that the initial cycling of DD 37 and CA 38 are delayed one cycle. When all of the fetch requests associated with the first block transfer have been placed on MSAB 46, then those associated with second requests are placed thereon beginning on cycle 12. The words associated with the second request appear on SB048 after those cycles associated with the first request and they are written into BS 35 in a manner similar to that just described. When word 13, the first word of the second block transfer appears on BSAB45, DD 37 is cycled to write in the block address.

As to the third fetch request F3, it should be noted in FIG. 7 that there is a gap between machine cycles 2 and 13 during which BSAB 45 is not being used. Thus, when fetch request F3 appears in cycle 8, it would be gated into the empty TAR 3 (not shown in FIG. 7). At the same time, DD 37 is cycled. In this example it is assumed that the word is located in BS 35. Accordingly, the match signal causes CA 38 to be updated indicating a successful fetch and at the same time it initiates cycling of BS 35. The sink address is gated from TAR 3 into sink bus 49 during cycle 9 and, on cycle 10, when the data appears on SBO 48, it is sent to the appropriate sink.

It should be also noted relative to FIG. 7 that the last word 4 of the first block transmit is written in BS 35 in cycle 21 whereas the last word 12 of the second block transmit is written in BS 35 in cycle 29. It should be thus apparent that the overlapped block transmit operation is highly advantageous in that it saves many machine cycles in the event that more than one block transfer is required. It should be noted though that the 29 cycles required for a double block transfer is a minimum number and is dependent upon the two factors that no intervening requests are granted any higher priority so as to delay the block transfer and that the words within the second block are located in BSM's not within the first block. Should the second block include BSM's that are within the first block, then there will be a delay in placing any requests on MSAB 46, due to the unavailability of the BSM. The worst case will be where the first word of the second block is located within the BSM of the last word of the first block. In such case, the transfer of the second block will have to be delayed until the appropriate BSM is no longer busy.

Other CPE Fetch Requests

As previously indicated, when a fetch request is placed on BSAB 45, the address of the word being fetched is compared with any addresses within SARS 41. In such a case, the fetch request is delayed until after the store operation has been completed. This delay is accomplished, at least in part, by setting the appropriate link to SAR bit of the appropriate TAR. After the store operation has been complete, and such bit goes off, the fetch request in the TAR can then be recycled.

Another different type of fetch operation occurs when a second fetch request comes in for a word having the same block address as that of a block associated with a previous fetch request, which block is in process of being transferred from main store to the buffer store. In this case, the second fetch request will be linked to the first by setting the appropriate compare to TAR bit. When the block transfer has been completed, the second request will be placed on the BSAB. For the second request, the word will be in the buffer store except in the event of an intervening I/O store operation which invalidates the particular block.

As indicated previously, the invention lies in the overall memory organization and in the multiple block transfer operation both of which have been described in detail above. As the principal advantage of a buffer store lies in reducing the effective memory access time during such operation, and such operations have been described above, the remaining operations of the CPE store and channel store and fetch requests will be only described in general.

CPE Store Request

A CPE store request is gated onto BSAB 45 and into an empty one of SAR's 41. Three cycles later, the corresponding data arrives and is gated into the SDB associated with the SAR containing the request. Since the data has arrived the SCU takes a priority cycle, and should there be no higher priorities, the SAR contents are gated onto MSAB 46 to start the memory cycle of the appropriate BSM in MS 34. Three cycles later, the data is gated from the SDB to gate 62 onto SBI 47 and into data register 83. Two cycles following the gating of the request onto MSAB43, the request is also gated onto BSAB54 where the set address cycles DD 37 to determine whether the location is also contained in BS 35. If it is, and a match signal is generated, then BS 35 is also cycled so that when the data appears on SBI47 it is gated via gate 62 into BS 35 so as to be written therein. If the location is not resident in BS 35, then there is no match signal and BS 35 is not cycled.

Channel requests are gated into a channel request register (CRR) 109. For a channel fetch request, when it is granted priority, the request is gated through gate 105 onto MSAB46 and, when the data arrives on SBO48, it is gated into channel buffer out (CBO) 111 for transfer to the channel. For channel store request, when the store request is placed on MSAB 46, it is also gated through gate 104 onto BSAB45 for bringing into play invalidating latch 99, in the manner previously described. The data associated with the store request is gated from the channel into a channel buffer in (CBI) 110. Three cycles after the store request is placed on MSAB46, the data from CBI 110 is gated onto SBI 47 for writing into MS 34 in a manner similar to that described with reference to other store operations.

In recapitulation, from the foregoing it will be seen that the invention is advantageous in that the buffer organization allows a large number of entries or blocks of data so as to minimize the amount of block transfer but without having to resort to a large scale, high cost associate memory scheme for keeping track of the entries in the buffer store. The invention is also advantageous in that it improves performance for fetch operations by providing independent busses for allowing the overlapping of such requests and block transfers.

While the invention has been particularly shown and described with reference to a preferred embodiment thereof, it will be understood by those skilled in the art that various changes in form and details may be made therein without departing from the spirit and scope of the invention.

We claim:

1. In a data processing system the combination comprising:

a central processing element (CPE);

a main memory having a multiplicity of word locations addressable in accordance with an addressing spectrum logically arranging said main memory into a plurality of sets of blocks of word locations, each set being defined by a set address, each block being identified by a block identifier and each word location within a block being identified by a block word address;

a buffer memory having a multiplicity of word locations addressable by an addressing spectrum logically arranging said buffer memory in a plurality of sets of blocks of word locations defined by said set addresses, block identifiers and block word addresses;

a data directory random access storage device having a plurality of word locations corresponding in number to the number of sets in said buffer memory and being addressable by said set addresses, each word location of said data directory being adapted to store the block identifiers of blocks of words within the associated set stored in said buffer memory;

a buffer storage address bus connected to therefore said CPE, said buffer memory and to said data directory for signalling CPE fetch request addresses;

said data directory including means responsive to the set address signals on said buffer storage address bus to read out said block identifiers corresponding to the set address of a CPE fetch request on said address bus;

comparing means operatively connected to said data directory and said address bus for comparing said block identifiers read from said data directory with the block identifier of a CPE fetch request address and providing a match-no match signal indicative of whether or not the word being fetched is in said buffer memory;

buffer memory addressing means responsive to a match signal for accessing said buffer memory to read out the word being fetched;

fetch request buffering means connected to said address bus for storing fetch request addresses;

means responsive to a match signal for eliminating the corresponding fetch request address from said fetch request buffering means; and and means responsive to a no match signal for transferring a block containing said word being fetched from said main memory to said buffer memory, whereby said fetch request buffering means provides the addresses for reading the words from said main memory and writing such words into said buffer memory.

2. The combination of claim 1 including:

a main storage address bus connected to said main memory and to said fetch request buffering means for supplying address information from said fetch request buffering means to said main storage;

and a storage bus-out connected to receive words from said main storage and transfer such words to said buffer memory for storage therein; and said fetch request buffering means further including means to transfer the addresses of a block of words being transferred to said main storage address bus during successive machine cycles and to later transfer the addresses of such block of words to said buffer storage address bus in synchronism with with words being placed on said storage bus-out, for writing such words into the respective addressed locations in said buffer memory.

3. The combination of claim 2 including:

second buffering means for temporarily storing CPE store request addresses and data for writing words into said memory system;

a storage bus-in for transferring words from said second buffering means to said main memory; and and means connecting said buffer memory to said storage bus-in for writing such words into said buffer memory when the location being stored is in resident in said buffer memory.

4. The combination of claim 2 wherein:

said fetch request buffering means includes a plurality of buffer positions to store a plurality of fetch request addresses for words within different blocks, and to supply addresses to said busses so as to overlap the control of the transfer of a plurality of blocks from said main memory to said buffer memory.

5. The combination of claim 1:

wherein said buffer memory addressing means includes means responsive to a match signal for generating signals identifying a block in a set in said buffer memory, whereby said buffer memory is accessed by an address having a first portion derived from a fetch request address and by a second portion comprised of said signals identifying a block in a set in said buffer memory.